(12) United States Patent
Yang et al.

(10) Patent No.: US 11,987,532 B1
(45) Date of Patent: May 21, 2024

(54) ION-MODIFIED MICROWAVE DIELECTRIC CERAMIC AND PREPARATION METHOD THEREOF, AND MICROWAVE COMPONENT

(71) Applicant: Huzhou Ceramic-Chip Electronic Technology Co., Ltd., Huzhou (CN)

(72) Inventors: YuanYuan Yang, Huzhou (CN); XiaoZhen Li, Kunming (CN); MengJiang Xing, Kunming (CN); YanLing Luo, Wuxi (CN); HongYu Yang, Xi'an (CN); QingYang Fan, Xi'an (CN); Liang Chai, Chengdu (CN); YiFang Zhang, Beijing (CN)

(73) Assignee: Huzhou Ceramic-Chip Electronic Technology Co., Ltd., Huzhou (CN)

( * ) Notice: Subject to any disclaimer, the term of this patent is extended or adjusted under 35 U.S.C. 154(b) by 0 days.

(21) Appl. No.: 18/494,743

(22) Filed: Oct. 25, 2023

(30) Foreign Application Priority Data

Oct. 26, 2022 (CN) .......................... 202211317183.0

(51) Int. Cl.
*C04B 35/626* (2006.01)
*C04B 35/462* (2006.01)
(Continued)

(52) U.S. Cl.
CPC .......... *C04B 35/495* (2013.01); *C04B 35/462* (2013.01); *C04B 35/6262* (2013.01);
(Continued)

(58) Field of Classification Search
CPC .......... C04B 35/462; C04B 2235/3284; C04B 2235/3232; C04B 2235/3255; C04B 2235/3258; C04B 2235/3244
See application file for complete search history.

(56) References Cited

U.S. PATENT DOCUMENTS 5,700,745 A * 12/1997 Okuyama ............ H01G 4/1245
501/137

OTHER PUBLICATIONS

Azough, F. Microstructural development and microwave dielectric properties of ceramics in the system zirconia-titania-tin oxide. The University of Manchester (United Kingdom) ProQuest Dissertations Publishing, 1991.30279535. (Year: 1991).*

(Continued)

*Primary Examiner* — Erin Snelting

(57) ABSTRACT

An ion-modified microwave dielectric ceramic is provided and a chemical formula thereof is $Zn_{0.15}Nb_{0.3}[Ti_{1-x}(W_{1/3}Zr_{1/2})_x]_{0.55}O_2$. In the chemical formula, x is in a range of 0.01 to 0.03. The ion-modified microwave dielectric ceramic includes the following components in parts by weight: 12.58-12.67 parts of ZnO, 41.11-41.39 parts of $TiO_2$, 43.93-45.14 parts of $Nb_2O_5$, 0.44-1.31 parts of $WO_3$, and 0.35-1.05 parts of $ZrO_2$. A preparation method of the ion-modified microwave dielectric ceramic can be applied to different industrial requirements, such as electronic components, communication equipment, and microwave components; and the obtained ion-modified microwave dielectric ceramic expands a practical value of a $Zn_{0.15}Nb_{0.3}Ti_{0.55}O_2$ series microwave dielectric ceramic in electronic ceramic manufacturing.

3 Claims, 2 Drawing Sheets

(51) Int. Cl.
  *C04B 35/495* (2006.01)
  *C04B 35/634* (2006.01)
  *C04B 35/638* (2006.01)
  *C04B 35/64* (2006.01)
  *H01B 3/12* (2006.01)
(52) U.S. Cl.
  CPC .. *C04B 35/62655* (2013.01); *C04B 35/62695* (2013.01); *C04B 35/63416* (2013.01); *C04B 35/638* (2013.01); *C04B 35/64* (2013.01); *H01B 3/12* (2013.01); *C04B 2235/3232* (2013.01); *C04B 2235/3244* (2013.01); *C04B 2235/3255* (2013.01); *C04B 2235/3258* (2013.01); *C04B 2235/3284* (2013.01); *C04B 2235/604* (2013.01); *C04B 2235/6562* (2013.01); *C04B 2235/6567* (2013.01); *C04B 2235/661* (2013.01)

(56) References Cited

OTHER PUBLICATIONS

CNIPA, Notification of First Office Action for CN202211317183.0, May 11, 2023.
Yunnan Infine Neo-material Co., Ltd. (Applicant), Reply to Notification of First Office Action for CN202211317183.0, w/ (allowed) replacement claims, Jul. 25, 2023.
CNIPA, Notification to grant patent right for invention in CN202211317183.0, Sep. 15, 2023.

\* cited by examiner

ION-MODIFIED MICROWAVE DIELECTRIC CERAMIC AND PREPARATION METHOD THEREOF, AND MICROWAVE COMPONENT

TECHNICAL FIELD

The disclosure relates to the technical field of electronic ceramics and manufacturing thereof, particularly to an ion-modified microwave dielectric ceramic and a preparation method thereof, and a microwave component.

BACKGROUND

In a context of explosive growth of data traffic in a mobile communication era, a working frequency of fifth generation (5G) mobile communication technology is developed towards millimeter-wave frequency band, thus enabling a communication system to have higher data rate and greater bandwidth. In addition, spectrum resources that can be used at high-frequency bands are also richer. Microwave dielectric ceramics are widely used in a variety of electronic components of 5G systems, such as dielectric resonators, filters, substrates, antennas, diplexers, and waveguides, and have broad market application prospects because of their miniaturization, easy integration, high stability, low insertion loss, and low power consumption.

Properties of the microwave dielectric ceramic mainly include: (1) an appropriate dielectric constant $\varepsilon_r$ value; (2) a high quality factor Q value (generally using Q×f to represent the quality factor value at a determined resonant frequency); and (3) a coordinated resonant frequency temperature coefficient $\tau_f$ value.

A rutile $Zn_{0.15}Nb_{0.3}Ti_{0.55}O_2$ ceramic system exhibits very excellent microwave dielectric properties at a sintering temperature of 1,075 degrees Celsius (° C.), such as: $\varepsilon_r$ is 93.1, Q×f is 11,815 gigahertz (GHz), and $\tau_f$ is 346.0 parts per million per degree Celsius (ppm/° C.). However, it is noted that the $\tau_f$ value is large, and then how to decrease the $\tau_f$ value while ensuring the high Q×f value is a very important research direction.

Under normal circumstances, adjusting the microwave dielectric properties of the ceramic material is mainly based on a two-phase recombination principle and a mixed logarithm law. Comprehensive properties of the microwave dielectric ceramic material are improved by introducing a system with an opposite $\tau_f$ value into a substrate of the ceramic material. However, the above introduction has a great limitation, which not only needs to ensure that the introduced modifier has a considerable $\varepsilon_r$ value or a high Q×f value, but also the introducer cannot react with a main crystal phase of the ceramic material, otherwise the microwave dielectric properties of the ceramic material cannot be accurately adjusted. Thus, in view of the rutile $Zn_{0.15}Nb_{0.3}Ti_{0.55}O_2$ ceramic system, there is a need to find a method that can more effectively adjust its microwave dielectric properties, so as to meet application requirements of the ceramic material in the radio frequency communication industry.

SUMMARY

Characteristics and advantages of the disclosure are set forth in part in the following description, or may be obvious from the following description, or may be learned by implementing the disclosure.

In order to overcome deficiencies in the related art, the disclosure provides an ion-modified microwave dielectric ceramic, of which a chemical formula is $Zn_{0.15}Nb_{0.3}[Ti_{1-x}(W_{1/3}Zr_{1/2})_x]_{0.55}O_2$, where x is in a range of 0.01 to 0.03. Moreover, the ion-modified microwave dielectric ceramic includes the following components in parts by weight: 12.58-12.67 parts of zinc oxide (ZnO), 41.11-41.39 parts of titanium dioxide ($TiO_2$), 43.93-45.14 parts of niobium oxide ($Nb_2O_5$), 0.44-1.31 parts of tungsten oxide ($WO_3$), and 0.35-1.05 parts of zirconium dioxide ($ZrO_2$).

In an embodiment, a sintering temperature of the ion-modified microwave dielectric ceramic is in a range of 1,050 degrees Celsius (° C.) to 1,150° C.

In an embodiment, the ion-modified microwave dielectric ceramic includes the following components in parts by weight: 12.67 parts of the ZnO, 41.39 parts of the $TiO_2$, 45.14 parts of the $Nb_2O_5$, 0.441 parts of the $WO_3$, and 0.352 parts of the $ZrO_2$.

In an embodiment, under the sintering temperature of 1,100° C., a dielectric constant of the ion-modified microwave dielectric ceramic is 90.8, a value of a quality factor Q×f of the ion-modified microwave dielectric ceramic is 14,381 gigahertz (GHz), and a temperature coefficient $\tau_f$ of the ion-modified microwave dielectric ceramic is 243.8 parts per million per degree Celsius (ppm/° C.).

The disclosure also provides a preparation method of the ion-modified microwave dielectric ceramic (such as an ion-modified rutile $Zn_{0.15}Nb_{0.3}Ti_{0.55}O_2$ series microwave dielectric ceramic) as described above and the preparation method includes the following steps:

preparing a raw material powder, including: mixing powders of the ZnO, the $TiO_2$, the $Nb_2O_5$, the $WO_3$, and the $ZrO_2$ according to the chemical formula of $Zn_{0.15}Nb_{0.3}[Ti_{1-x}(W_{1/3}Zr_{1/2})_x]_{0.55}O_2$ to obtain the raw material powder;

first ball milling, including: loading the raw material powder into a ball milling tank, using zirconium balls and deionized water as grinding media of a first planet ball milling and performing the first planet ball milling for 4-6 hours (h) according to a mass ratio of the raw material powder: the zirconium balls: the deionized water of 1: 4-6: 2-4 to obtain a mixed slurry, drying the mixed slurry in an oven after the first planet ball milling and then sieving with a 80-100 mesh sieve to obtain a sieved powder; and sintering the sieved powder in an atmosphere of 900° C.-1,000° C. for 3-5 hours to obtain a pre-sintering material;

second ball milling, including: performing a second planet ball milling on the pre-sintering material, zirconium balls, and deionized water for 6-8 hours according to a mass ratio of the pre-sintering material: the zirconium balls: the deionized water of 1: 5-7: 3-5 to obtain a ball-milled material, drying the ball-milled material and then adding a polyvinyl alcohol solution, as a binder, into the ball-milled material, and performing granulation on the ball-milled material added with the polyvinyl alcohol solution to obtain a ceramic raw material; and compression molding, including: performing compression molding operation on the ceramic raw material to obtain a molded ceramic, then performing glue-discharging operation on the molded ceramic at a temperature of 600° C.-650° C. for 2-4 hours with a heating rate of 2-4 degrees Celsius per minute (° C./min), then heating the molded ceramic to a temperature of 1,050° C.-1,150° C. with a heating rate of 2-4° C./min and then maintaining the temperature of 1,050° C.-1,150° C. for 4-6 hours to obtain the ion-modified rutile $Zn_{0.15}Nb_{0.3}Ti_{0.55}O_2$ series microwave dielectric ceramic.

In an embodiment, the disclosure provides a microwave component, which is prepared from the above mentioned ion-modified rutile $Zn_{0.15}Nb_{0.3}Ti_{0.55}O_2$ series microwave dielectric ceramic.

Beneficial effects of the disclosure are as follows: the disclosure not only maintains the high Q×f value characteristic of the microwave dielectric ceramic, but also reduces the $\tau_f$ value to a certain extent, thereby improving the temperature stability of resonant frequency and preparing the microwave dielectric ceramic material with high Q×f value, low cost, and good process stability. Moreover, the obtained product (i.e., the ion-modified microwave dielectric ceramic) prepared by the preparation method of the disclosure can be applied to different industrial requirements, such as electronic components, communication equipment, and microwave components; and a $Zn_{0.15}Nb_{0.3}Ti_{0.55}O_2$ series ceramic material is of great value in the field of electronic ceramic manufacturing.

BRIEF DESCRIPTION OF DRAWINGS

Advantages and implementations of the disclosure will be more apparent from the following detailed description of the disclosure with reference to attached drawings, in which contents are for a purpose of explanation of the disclosure only and are not intended to limit the disclosure in any sense.

DETAILED DESCRIPTION OF EMBODIMENTS

Figure 1:
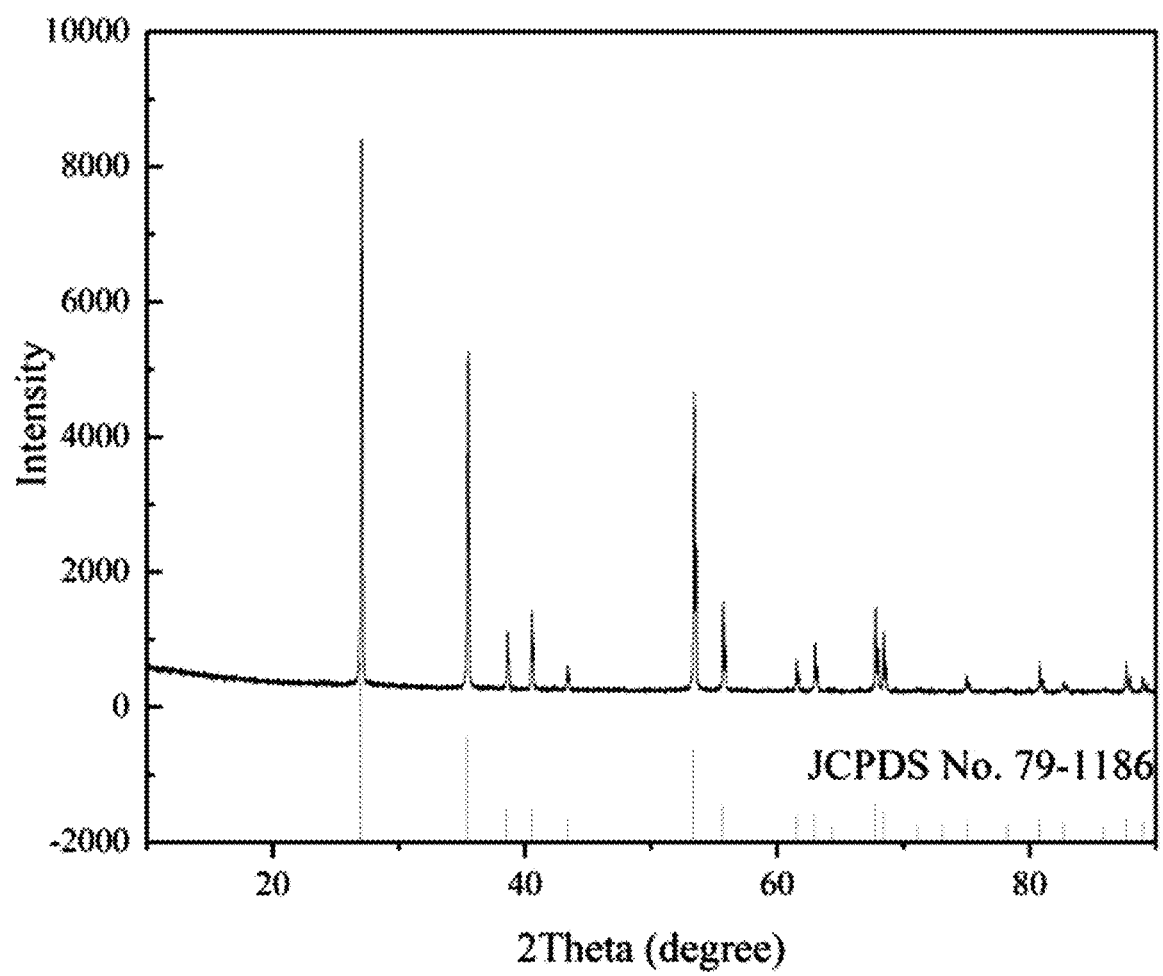
FIG. 1 illustrates an X-ray diffraction (XRD) spectrum of an embodiment 1 according to the disclosure.

Implementation modes of the disclosure will be further described in detail below with reference to the attached drawings and embodiments. The following embodiments are used to illustrate the disclosure, but cannot be used to limit the scope of the disclosure.

The disclosure provides an ion-modified microwave dielectric ceramic, a chemical formula of the ion-modified microwave dielectric ceramic is $Zn_{0.15}Nb_{0.3}[Ti_{1-x}(W_{1/3}Zr_{1/2})_x]_{0.55}O_2$, where x is in a range of 0.01 to 0.03; and the ion-modified microwave dielectric ceramic includes the following components in parts by weight: 12.58-12.67 parts of zinc oxide (ZnO), 41.11-41.39 parts of titanium dioxide ($TiO_2$), 43.93-45.14 parts of niobium oxide ($Nb_2O_5$), 0.44-1.31 parts of tungsten oxide ($WO_3$), and 0.35-1.05 parts of zirconium dioxide ($ZrO_2$).

In an embodiment of the disclosure, a sintering temperature of the ion-modified microwave dielectric ceramic is in a range of 1,050 degrees Celsius (° C.) to 1,150° C.

In an illustrated embodiment of the disclosure, the ion-modified microwave dielectric ceramic includes the following components in parts by weight: 12.67 parts of the ZnO, 41.39 parts of the $TiO_2$, 45.14 parts of the $Nb_2O_5$, 0.441 parts of the $WO_3$, and 0.352 parts of the $ZrO_2$. Furthermore, under the sintering temperature of 1,100° C., a dielectric constant of the ion-modified microwave dielectric ceramic is 90.8, a value of a quality factor Q×f of the ion-modified microwave dielectric ceramic is 14,381 gigahertz (GHz), and a temperature coefficient $\tau_f$ of the ion-modified microwave dielectric ceramic is 243.8 parts per million per degree Celsius (ppm/° C.).

The disclosure also provides a preparation method of the ion-modified microwave dielectric ceramic, which is used to prepare an ion-modified rutile $Zn_{0.15}Nb_{0.3}Ti_{0.55}O_2$ series microwave dielectric ceramic, and the preparation method includes the following steps:

preparing a raw material powder, including: mixing powders of the ZnO, the $TiO_2$, the $Nb_2O_5$, the $WO_3$, and the $ZrO_2$ (also referred as to raw materials) according to the chemical formula of $Zn_{0.15}Nb_{0.3}[Ti_{1-x}(W_{1/3}Zr_{1/2})_x]_{0.55}O_2$ to obtain the raw material powder;

first ball milling, including: loading the raw material powder into a ball milling tank, using zirconium balls and deionized water as grinding media of a first planet ball milling and performing the first planet ball milling for 4-6 hours (h) according to a mass ratio of the raw material powder: the zirconium balls: the deionized water of 1: 4-6: 2-4 to obtain a mixed slurry, drying the mixed slurry in an oven after the first planet ball milling and then sieving with a 80-100 mesh sieve to obtain a sieved powder; and sintering the sieved powder in an atmosphere of 900° C.-1,000° C. for 3-5 hours to obtain a pre-sintering material;

second ball milling, including: performing a second planet ball milling on the pre-sintering material, zirconium balls, and deionized water for 6-8 hours according to a mass ratio of the pre-sintering material: the zirconium balls: the deionized water of 1: 5-7: 3-5 to obtain a ball-milled material, drying the ball-milled material and then adding a polyvinyl alcohol solution, as a binder, into the ball-milled material, and granulating granulation on the ball-milled material added with the polyvinyl alcohol solution to obtain a ceramic raw material; and compression molding, including: performing compression molding operation on the ceramic raw material to obtain a molded ceramic, then performing glue-discharging operation on the molded ceramic at a temperature of 600° C.-650° C. for 2-4 hours with a heating rate of 2-4 degrees Celsius per minute (° C./min), then heating the molded ceramic to a temperature of 1,050° C.-1,150° C. with a heating rate of 2-4° C./min and then maintaining the temperature of 1,050° C.-1,150° C. for 4-6 hours to obtain the ion-modified microwave dielectric ceramic with the chemical formula of $Zn_{0.15}Nb_{0.3}[Ti_{1-x}(W_{1/3}Zr_{1/2})_x]_{0.55}O_2$ (i.e., the ion-modified rutile $Zn_{0.15}Nb_{0.3}Ti_{0.55}O_2$ series microwave dielectric ceramic).

In order to better explain technical effects of the disclosure, 3 samples are prepared in embodiments 1-3 according to the above preparation method. Each component of the raw materials in parts by weight and sintering temperatures in the embodiments 1-3 are shown in Table 1.

Table 1 illustrates the components of the raw materials in parts by weight and the sintering temperatures in the embodiments 1-3.

| Embodiment No. | | 1 | 2 | 3 |
|---|---|---|---|---|
| Parts of each component/g | ZnO | 12.673 | 12.631 | 12.589 |
| | $Nb_2O_5$ | 41.390 | 41.251 | 41.113 |
| | $TiO_2$ | 45.143 | 44.537 | 43.935 |
| | $WO_3$ | 0.441 | 0.879 | 1.315 |
| | $ZrO_2$ | 0.352 | 0.701 | 1.048 |
| Sintering temperature (° C.) | | 1,100 | 1,100 | 1,100 |

The components in parts by weight adopted by the embodiments 1-3 are the optimal ratio of the raw materials used in preparing the ion-modified microwave dielectric ceramic of the disclosure, and then the raw materials of the embodiments 1-3 are used to prepare the ion-modified rutile $Zn_{0.15}Nb_{0.3}Ti_{0.55}O_2$ series microwave dielectric ceramics corresponding to the embodiments 1-3 according to the preparation method provided by the disclosure. The obtained ion-modified rutile $Zn_{0.15}Nb_{0.3}Ti_{0.55}O_2$ series microwave dielectric ceramics are detected to obtain various performance parameters and mappings of the samples in the embodiments 1-3. Specially, the various performance parameters of the samples in the embodiments 1-3 are shown in Table 2.

Table 2 illustrates the various performance parameters of the samples in the embodiments 1-3.

| Embodiment NO. | Diameter (mm) | Height (mm) | Dielectric constant ($\varepsilon_r$) | Q × f (GHz) | $\tau_f$ (ppm/° C.) |
|---|---|---|---|---|---|
| 1 | 13.05 | 6.76 | 90.8 | 14,381 | 243.8 |
| 2 | 13.05 | 6.65 | 87.2 | 11,254 | 253.1 |
| 3 | 12.99 | 6.31 | 85.6 | 8,984 | 266.7 |

Figure 2:
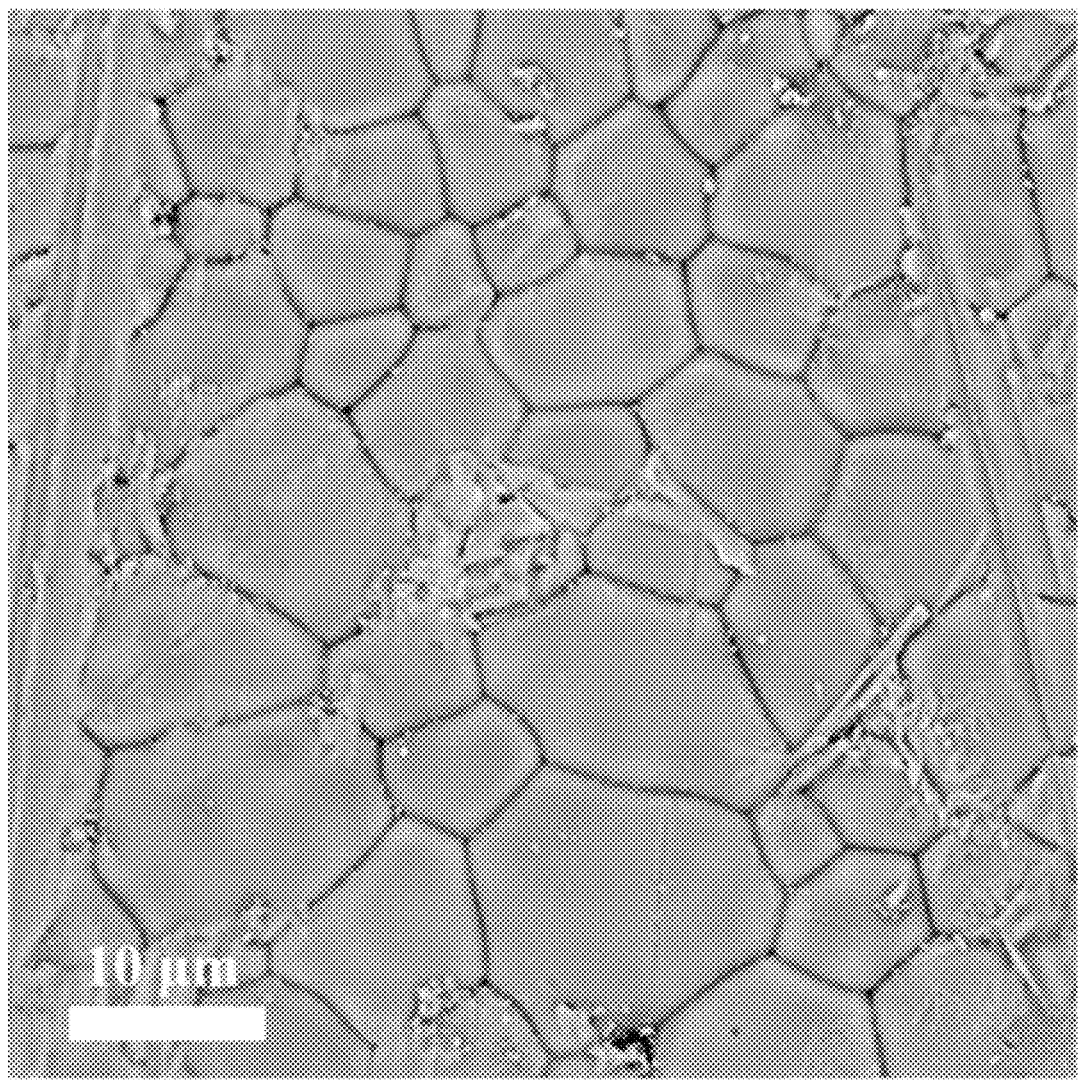
FIG. 2 illustrates a scanning electron microscopy (SEM) mapping of the embodiment 1 according to the disclosure.

FIG. 1 illustrates the XRD spectrum of the embodiment 1. After retrieval, a phase composition of the obtained ion-modified microwave dielectric ceramic is pure rutile $Zn_{0.15}Nb_{0.3}Ti_{0.55}O_2$ phase that matches with a standard card of JCPDS79-1186. Besides, there are no residual phase diffraction peaks, indicating that composite ions of $(W_{1/3}Zr_{1/2})^{4+}$ successfully enter a Ti site and form sosoloid, and dopants added in the preparation process do not change the composition of the phase. FIG. 2 illustrates the SEM mapping of the embodiment 1 it can be seen from FIG. 2 that at the sintering temperature of 1,100° C., a grain size of the sample in the embodiment 2 has been fully grown, indicating less micro-pores on a surface of the sample and low porosity. The above characteristics indicate that a sintering compactness of the ion-modified rutile $Zn_{0.15}Nb_{0.3}Ti_{0.55}O_2$ series microwave dielectric ceramic is promoted by a substitution of the composite ions of $(W_{1/3}Zr_{1/2})^{4+}$.

It can be seen from the data shown in the Table 1 and the Table 2 that, in the embodiments 1-3, the dielectric constants and the values of the quality factors Q×f of the samples decrease compared to the values before the ion modification; and the if values of the embodiments 1-3 are between 243 and 267 ppm/° C., which is also lower than a conventional rutile $Zn_{0.15}Nb_{0.3}Ti_{0.55}O_2$ series microwave dielectric ceramic. Specially, in the embodiment 1, when a doping amount of the composite ions (i.e., the composite ions of $(W_{1/3}Zr_{1/2})^{4+}$) is 0.01 moles (mol), a crystal structure of a ceramic system does not change, appearing on a rutile sosoloid structure; and at the same time, an external sintering compactness of the sample of the embodiment 1 is high, which indicates that microwave dielectric properties of the ceramic system is more limited by the crystal structure, but the dielectric constant is slightly reduced from 93.1 of the pure phase to 90.8. However, the value of the quality factor Q×f at this time has a relatively large increase trend, and increases from 11,815 GHz of the pure phase to 14,381 GHz. More importantly, the $\tau_f$ value of the ceramic system is reduced to a certain extent, and is reduced to 243.8 ppm/° C. from 346.0 ppm/° C. Therefore, the doping of the composite ions of $(W_{1/3}Zr_{1/2})^{4+}$ not only maintains the characteristic of the high value of the quality factor Q×f of the conventional rutile $Zn_{0.15}Nb_{0.3}Ti_{0.55}O_2$ series microwave dielectric ceramic, but also increases the temperature stability of the resonant frequency to some extent, thereby expanding the practical value of the $Zn_{0.15}Nb_{0.3}Ti_{0.55}O_2$ series microwave dielectric ceramic in the field of electronic ceramic manufacturing.

The ion-modified rutile $Zn_{0.15}Nb_{0.3}[Ti_{1-x}(W_{1/3}Zr_{1/2})_x]_{0.55}O_2$ series microwave dielectric ceramic may be applied to microwave components, electronic components, and communications devices.

The illustrated embodiments of the disclosure are described above with reference to the attached drawings. Those skilled in the related art can make multiple variant solutions to implement the disclosure, which are not separated from the scope and the essence of the disclosure. For example, the features shown or described as parts of one embodiment can be used in another embodiment to obtain another technical solution. The above are only illustrated and feasible embodiments of the disclosure, and therefore do not limit the scope of the protection of the disclosure. Any equivalent changes made by using the specification and the attached drawings of the disclosure are included in the scope of the protection of the disclosure.

What is claimed is:

1. A preparation method of an ion-modified microwave dielectric ceramic, comprising the following steps:
   preparing a raw material powder, comprising: mixing powders of zinc oxide (ZnO), titanium dioxide ($TiO_2$), niobium oxide ($Nb_2O_5$), tungsten oxide ($WO_3$), and zirconium dioxide ($ZrO_2$) according to a chemical formula of $Zn_{0.15}Nb_{0.3}[Ti_{1-x}(W_{1/3}Zr_{1/2})_x]_{0.55}O_2$ to obtain the raw material powder, wherein x is in a range of 0.01 to 0.03; and wherein the ZnO is 12.58-12.67 parts by weight, the $TiO_2$ is 41.11-41.39 parts by weight, the $Nb_2O_5$ is 43.93-45.14 parts by weight, the $WO_3$ is 0.44-1.31 parts by weight, and the $ZrO_2$ is 0.35-1.05 parts by weight;
   first ball milling, comprising: loading the raw material powder into a ball milling tank, using zirconium balls and deionized water as grinding media of a first planet ball milling and performing the first planet ball milling for 4-6 hours (h) according to a mass ratio of the raw material powder: the zirconium balls: the deionized water of 1: 4-6: 2-4 to obtain a mixed slurry, drying the mixed slurry in an oven after the first planet ball milling and then sieving with a 80-100 mesh sieve to obtain a sieved powder; and sintering the sieved powder in an atmosphere of 900° C.-1,000° C. for 3-5 hours to obtain a pre-sintering material;
   second ball milling, comprising: performing a second planet ball milling on the pre-sintering material, zirconium balls, and deionized water for 6-8 hours according to a mass ratio of the pre-sintering material: the zirconium balls: the deionized water of 1: 5-7: 3-5 to obtain a ball-milled material, drying the ball-milled material and then adding a polyvinyl alcohol solution, as a binder, into the ball-milled material, and performing granulation on the ball-milled material added with the polyvinyl alcohol solution to obtain a ceramic raw material; and
   compression molding, comprising: performing compression molding operation on the ceramic raw material to obtain a molded ceramic, then performing glue-discharging operation on the molded ceramic at a temperature of 600° C.-650° C. for 2-4 hours with a heating rate of 2-4 degrees Celsius per minute (° C./min), then heating the molded ceramic to a sintering temperature of 1,050° C.-1,150° C. with a heating rate of 2-4° C./min and then maintaining the sintering temperature of 1,050° C.-1,150° C. for 4-6 hours to obtain the ion-modified microwave dielectric ceramic with the chemical formula of $Zn_{0.15}Nb_{0.3}[Ti_{1-x}(W_{1/3}Zr_{1/2})_x]_{0.55}O_2$.

2. The preparation method of the ion-modified microwave dielectric ceramic as claimed in claim 1, wherein the ZnO is 12.67 parts by weight, the $TiO_2$ is 41.39 parts by weight, the $Nb_2O_5$ is 45.14 parts by weight, the $WO_3$ is 0.441 parts by weight, and the $ZrO_2$ is 0.352 parts by weight.

3. The preparation method of the ion-modified microwave dielectric ceramic as claimed in claim 1, wherein the sintering temperature is 1,100° C., a dielectric constant of the ion-modified microwave dielectric ceramic is 90.8, a value of a quality factor Q×f of the ion-modified microwave dielectric ceramic is 14,381 gigahertz (GHz), and a temperature coefficient $\tau_f$ of the ion-modified microwave dielectric ceramic is 243.8 parts per million per degree Celsius (ppm/° C.).

\* \* \* \* \*